US008914592B2

(12) United States Patent
Harasawa et al.

(10) Patent No.: US 8,914,592 B2
(45) Date of Patent: Dec. 16, 2014

(54) DATA STORAGE APPARATUS WITH NONVOLATILE MEMORIES AND METHOD FOR CONTROLLING NONVOLATILE MEMORIES

(75) Inventors: Akinori Harasawa, Kunitachi (JP); Tohru Fukuda, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 13/299,282

(22) Filed: Nov. 17, 2011

(65) Prior Publication Data

US 2012/0144094 A1    Jun. 7, 2012

(30) Foreign Application Priority Data

Dec. 1, 2010 (JP) .................................. 2010-268303

(51) Int. Cl.
*G06F 12/00* (2006.01)
*G06F 3/06* (2006.01)
*G06F 12/16* (2006.01)
*G06F 13/16* (2006.01)

(52) U.S. Cl.
CPC ........ *G06F 3/06* (2013.01); *G06F 12/16* (2013.01); *G06F 13/1673* (2013.01)
USPC ................ 711/155; 711/5; 711/151; 711/169

(58) Field of Classification Search
CPC ... G06F 12/0607; G06F 13/18; G06F 9/3004; G11C 7/1039
USPC ............................. 711/103, 5, 151, 155, 169
See application file for complete search history.

(56) References Cited

U.S. PATENT DOCUMENTS

| 5,515,500 | A | 5/1996 | Mizuno et al. | |
|---|---|---|---|---|
| 6,295,581 | B1 * | 9/2001 | DeRoo | 711/135 |
| 6,549,977 | B1 * | 4/2003 | Horst et al. | 711/113 |
| 7,882,299 | B2 | 2/2011 | Conley et al. | |
| 2006/0136656 | A1 | 6/2006 | Conley et al. | |
| 2009/0024808 | A1 * | 1/2009 | Hillier et al. | 711/155 |
| 2010/0235568 | A1 | 9/2010 | Inamura | |

FOREIGN PATENT DOCUMENTS

| JP | 06-332623 A | 12/1994 |
|---|---|---|
| JP | 2008-524747 | 12/2005 |
| JP | 2010-211734 | 9/2010 |
| JP | 2012-113476 A | 6/2012 |
| WO | WO 2006/068916 A1 | 6/2006 |

OTHER PUBLICATIONS

First Office Action mailed May 28, 2013 in corresponding Japanese Patent Application No. 2010-268303 in five (5) pages.

* cited by examiner

*Primary Examiner* — Gurtej Bansal
(74) *Attorney, Agent, or Firm* — Knobbe Martens Olson & Bear LLP

(57) ABSTRACT

According to one embodiment, a data storage apparatus includes a write command module, a read command module, and a controller. The write command module is configured to process a write command for writing data to the nonvolatile memories for a plurality of channels, respectively. The read command module is configured to process a read command usually and to process a read command for read modify write (RMW) operation. The controller is configured to control the read command module, causing to execute the read command for the RMW operation, prior to the normal read command, thereby to execute a flush command, and to control the write command module, causing to execute a write flush process that includes the processing of a write command for the RMW operation after the read command for the RMW operation has been executed.

20 Claims, 3 Drawing Sheets

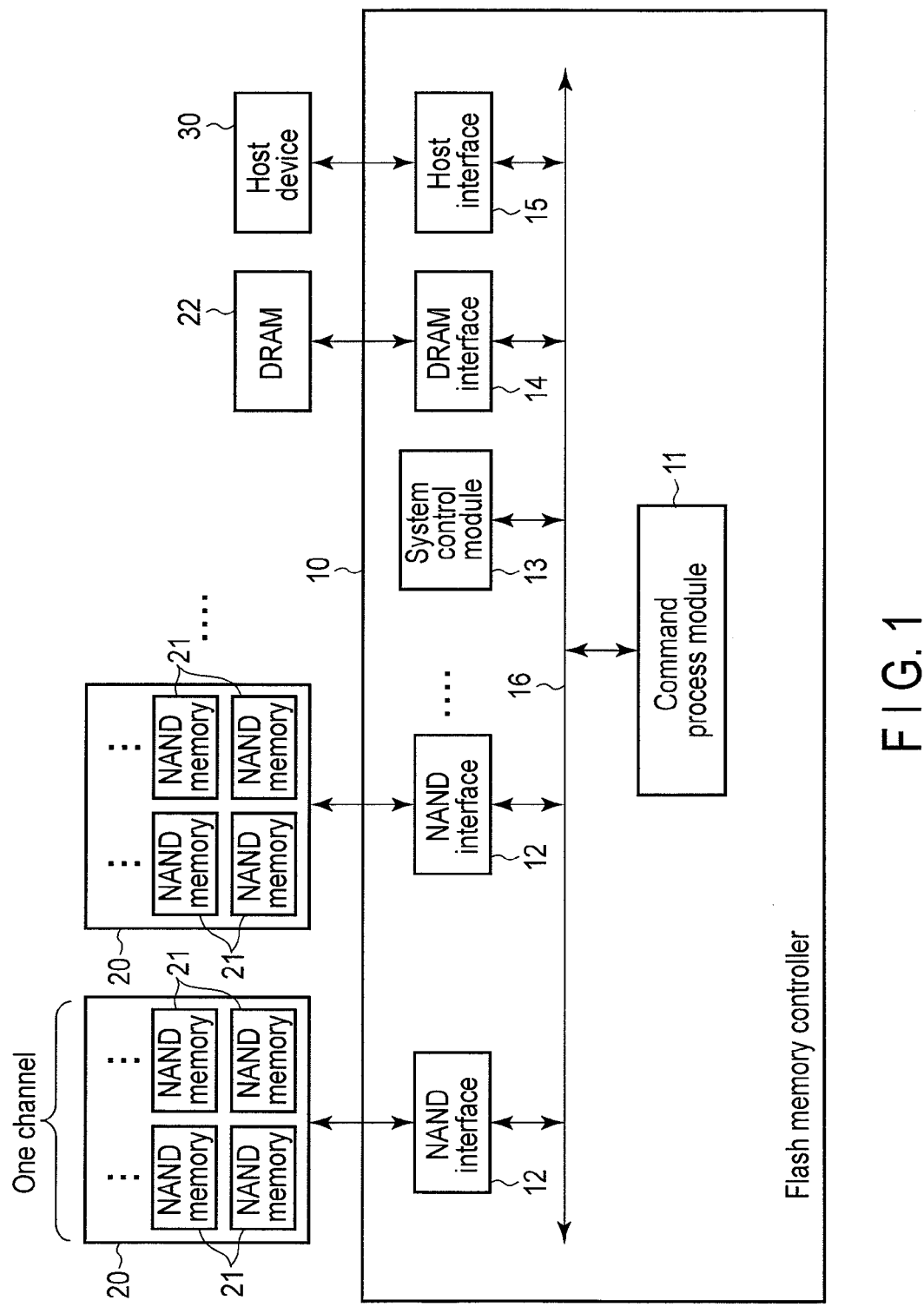
F I G. 1

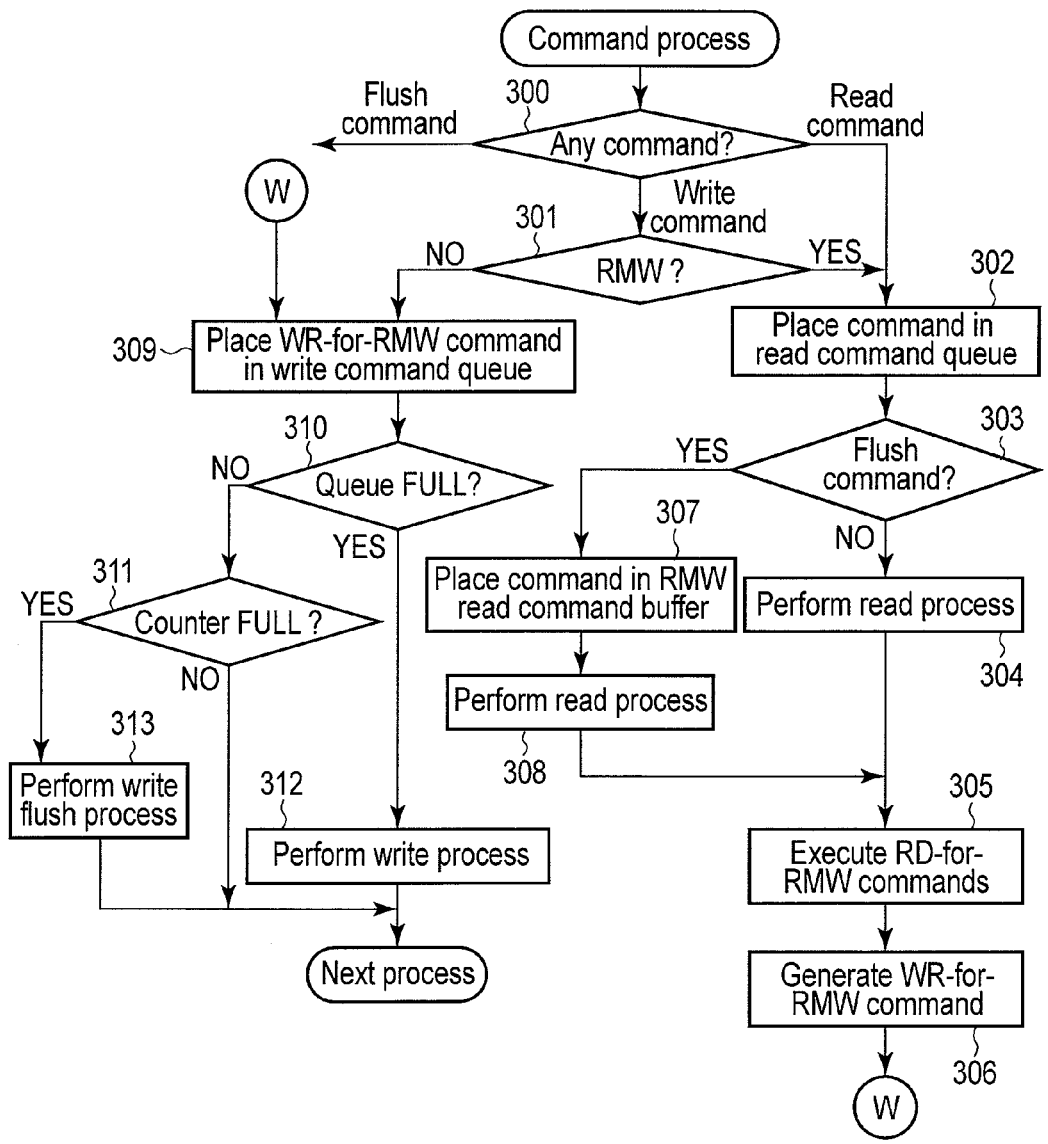
F I G. 3

DATA STORAGE APPARATUS WITH NONVOLATILE MEMORIES AND METHOD FOR CONTROLLING NONVOLATILE MEMORIES

CROSS-REFERENCE TO RELATED APPLICATIONS

This application is based upon and claims the benefit of priority from prior Japanese Patent Application No. 2010-268303, filed Dec. 1, 2010, the entire contents of which are incorporated herein by reference.

FIELD

Embodiments described herein relate generally to a data storage apparatus that uses nonvolatile memories as storage media.

BACKGROUND

In recent years, solid-state drives (SSDs) have been developed, as data storage apparatuses, each using NAND flash memories (hereinafter referred to as "flash memories" in some cases) that are rewritable nonvolatile memories.

In most SSDs, data is written in parallel to the flash memories provided, respectively, for a plurality of channels, thus achieving write operation of multichannel program scheme. In the write operation of multichannel program scheme, it become possible to write data in parallel to the flash memories for all channels when the data (i.e., user data) to be written for all channels is completely stored in a buffer memory.

In other words, unless the data to be written for all channels is prepared, the parallel writing cannot be accomplished, possibly interrupting the write operation. In this state, the main power supply for the SSD may be cut. In this case, the write operation interrupted must be forcibly performed to finish writing data to the flash memories, in order to save the memory stored in the buffer memory. The function of forcibly performing the write operation is known as "write flush function." The command that initiates the write flush function (the write operation for write flush process) is called a "flush command."

In the conventional SSD, the multichannel program scheme accomplishes the write operation at high efficiency, performing the write flush process and ultimately preventing the data from being lost. The write flush process is performed by using a spare power supply such as a capacitor, and should therefore be completed at high efficiency (or within a short time) so that the data to protect may be reliably prevented from being lost.

In the SSD, a write operation known as a "read modify write (RMW) process," which includes a read process, may be performed in some cases, along with the normal write operation. The write flush process of the multichannel program scheme, which includes the RMW process, must therefore be so efficiently performed that the data to protect may be reliably prevented from being lost.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram explaining the configuration of a data storage apparatus according to an embodiment;

FIG. 3 is a flowchart explaining the operation of the command process module according to the embodiment.

DETAILED DESCRIPTION

Figure 2:
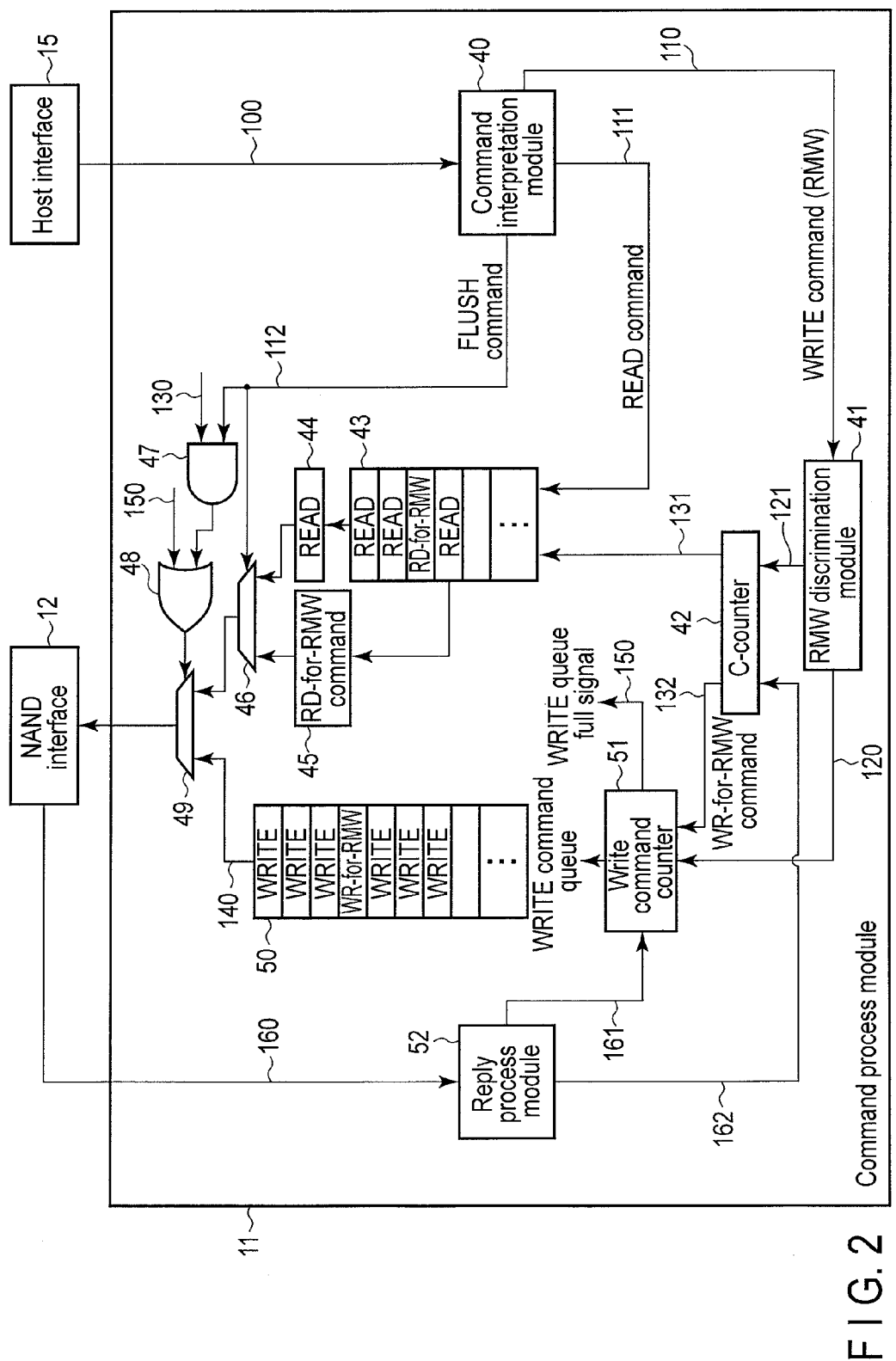
FIG. 2 is a block diagram showing the major components of the flash memory controller according to the embodiment.

Various embodiments will be described hereinafter with reference to the accompanying drawings.

In general, according to one embodiment, a data storage apparatus comprises a write command module, a read command module, and a controller. The write command module is configured to process a write command for writing data to the nonvolatile memories for a plurality of channels, respectively. The read command module is configured to process a read command usually and to process a read command for read modify write (RMW) in order to perform a RMW process. The controller is configured to control the read command module, causing to execute the read command for RMW, prior to the normal read command, thereby to execute a flush command, and to control the write command module, causing to execute a write flush process that includes the processing of a write command for RMW after the read command for RMW has been executed.

[Configuration of the SSD]

As seen from FIG. 1, a data storage apparatus according to the embodiment is a solid state drive (SSD) of multichannel program scheme, which uses NAND type flash memories (hereinafter called "flash memories") 21 as storage media. The SSD has a flash memory controller (hereinafter called a "memory controller") 10, memory packages 20, and a buffer memory 22. Each of the memory packages 20 (hereinafter called "channels") is composed of a plurality of flash memories 21. The buffer memory 22 is constituted by a dynamic random access memory (DRAM).

The memory controller 10 has a command process module 11, NAND memory interfaces 12, a system control module 13, a DRAM interface 14, a host interface 15, and a bus 16. The NAND memory interfaces 12 are associated with the channels 20, respectively. The memory controller 10 has a multichannel program function of writing data (user data) in parallel to the flash memories 21 of each channel 20 through the NAND memory interface 12 associated with the channel 20 when the data is ready to be written to all channels 20.

Through the NAND memory interface 12, the system control module 13 controls the process of writing data to, and the process of reading data from, each flash memory 21. The DRAM interface 14 controls the data transfer between the buffer memory 22 and the bus 16. That is, the system control module 13 writes data to the buffer memory 22 through the DRAM interface 14, and reads data from the buffer memory 22 through the DRAM interface 14. The host interface 15 controls the transfer of data or commands between the bus 16 and a host device 30. The host device 30 is, for example, a personal computer.

The command process module 11 is composed mainly of a write command module and a read command module. Hence, the command process module 11 can process various commands issued from the host device 30 and can transfer a write command and a read command to the NAND memory interface 12.

In this embodiment, the write command contains not only a normal write command (hereinafter called a "WRITE command") for achieving a normal data write operation, but also a write command (hereinafter called a "WR-for-RMW command") for achieving a read modify write (RMW) operation that will be described later. Further, the read command contains not only a normal read command (hereinafter called a "READ command") for achieving a normal data read process, but also a read command (hereinafter called an "RD-for-RMW command") for performing the read process included in the RMW operation.

As shown in FIG. 2, the command process module 11 has a command interpretation module 40, an RMW discrimination module 41, a credit counter (hereinafter called a "C-counter") 42, a read command queue 43, a read command buffer 44, and a RMW read command buffer 45.

The command process module 11 further has a write command queue 50, a write command counter 51, and a reply process module 52. Still further, the command process module 11 has a logic circuit including a selector 46, an AND gate 47 and an OR gate 48.

[Write Flush Process]

The write flush process will be explained, along with the operation of the command process module 11, with reference to the block diagram of FIG. 2 and the flowchart of FIG. 3.

In the command process module 11, the command interpretation module 40 interprets a command 100 transferred from the host device 30 through the host interface 15. In accordance with the result of the interpretation, the command process module 11 processes a write command 110, a read command 111, or a flush command 112 (Block 300). As described above, the write command 110 contains a WR-for-RMW command for executing the RMW operation.

The flush command 112 is issued from the microprocessor (MPU) incorporated in the SSD when the main power supply is cut from the SSD. In response to the flush command 112, the command process module 11 performs the write flush process, which will be explained later in detail. Assume that the flush command 112 is issued in this embodiment, interrupting the execution of either the write command 110 or the read command 111.

The RMW discrimination module 41 determines whether the write command 110 coming from the command interpretation module 40 is an normal write command (i.e., a WRITE command) or a write command for read modify write (i.e., a WR-for-RMW command) (Block 301). If the data size pertaining to the write command 110 is smaller than the normal write unit (i.e., a cluster) for each flash memory 21 (YES in Block 301), the RMW discrimination module 41 determines that the write command 110 is a WR-for-RMW command. In the RMW operation, a part of the data being written in the normal write operation is rewritten, and the remaining part of the data is written again without being changed at all.

If the RMW discrimination module 41 determines that the write command 110 is an normal write command (WRITE), this write command (WRITE) 120 is placed (queued) in the write command queue 50. (Block 309). At this point, the write commands waiting in the write command queue 50 is counted up.

Assume that the write command (WRITE) is thereafter queued to the write command queue 50, thus preparing the write command for all channels. Then, the write command counter 51 outputs a WRITE queue full signal 150 (YES in Block 310).

As seen from FIG. 2, the selector 49 selects a write command 140 output from the write command queue 50, in accordance with the WRITE queue full signal 150 output from the write command counter 51. As a result, the write command queue 50 sends the write command (WRITE) for all channels to the NAND memory interfaces 12 for all respective channels. A write process is thereby performed, writing the data (user data) in parallel to the flash memories 21 for all respective channels 20 (Block 312). In other words, the multichannel program is executed. Note that the data (user data) to be written to all channels 20 is stored in the buffer memory 22.

When the multichannel program is completely executed, each NAND memory interface 12 outputs a reply signal 160 to the reply process module 52, informing the module 52 that the write process has been correctly performed. On determining that the write process has been correctly performed for all channels 20, the reply process module 52 sends a reset signal 161 to the write command counter 51.

The write command counter 51 manages the number of write commands (WRITE) to be written. Hence, if the write command counter 51 is reset, the command process module 11 determines that the write command queue 50 holds no write commands (WRITE) to be written.

If the command 100 is a write command for RMW, the RMW discrimination module 41 generates an RD-for-RMW command 121 (YES in Block 301). An RD-for-RMW command 131 output from the C-counter 42 is placed (queued) in the read command queue 43 (Block 302). At this point, the C-counter 42 consumes (counts down) the credit by one. From the C-counter 42, the command process module 11 can determine the number of RD-for-RMW commands (in fly state) either being executed or to be executed, as will be explained later.

The command interpretation module 40 may interpret the command 100 transferred through the host interface 15 is an normal read command (READ) 111 (Block 300). In this case, the normal read command (READ) 111 queued in the read command queue 43 (Block 302). As a result, the READ command and the RD-for-RMW command are sequentially stored in the order they arrive.

Assume that WRITE commands for all channels have not been prepared, the multichannel program cannot be executed, and no flush commands have been generated (NO in Block 303). Then, READ commands or RD-for-RMW commands are sequentially sent from the read command queue 43 to the NAND memory interfaces 12. As a result, the data (user data) is read from the flash memories 21. The read process is thereby performed (Block 304).

More specifically, as shown in FIG. 2, READ commands or RD-for-RMW commands are sequentially placed in the read command buffer 44 from the read command queue 43. The READ commands or RD-for-RMW commands placed in the read command buffer 44 are sent to the NAND memory interfaces 12 of the respective channels through the selectors 46 and 49. The read commands (READ commands or RD-for-RMW commands) are sent to in the NAND memory interfaces 12, not necessarily in the very order they are supplied to the read command queue 43. Rather, a command may be sent to the associated interface 12, prior to any other that has been earlier supplied to the read command queue 43.

When the read process is completely performed in accordance with the RD-for-RMW commands, the reply process module 52 receives, from the NAND memory interfaces 12, the replay signals 160 informing the completion of the read process (YES in Block 305). The reply process module 52 generates a WR-for-RMW command 162 (Block 306).

The WR-for-RMW command is a write command for executing a write process that is the second phase of the RMW operation. That is, in the first phase of the RMW operation, the data to rewrite is read and saved. This read process performed in the first phase is performed in response to an RD-for-RMW command. In the second phase of the RMW operation, the data read is first rewritten in part and then written again.

The C-counter 42 restores (count up) the credit by one, in response to the WR-for-RMW command 162 coming from the reply process module 52. The WR-for-RMW command 162 is placed (queued) in the write command queue 50 (Block 309). On receiving a RW-for-RMW command 132 from the C-counter 42, the write command counter 51 counts up the number of write commands by one.

As indicated above, the command process module 11 can recognize the number of RMW commands (in fly state), either being executed or to be executed, from the C-counter 42. Nonetheless, the command process module 11 may recognize the RMW commands (in fly state) by any method not using the C-counter 42.

The C-counter 42 is configured to count RD-for-RMW commands that assume a fly state (for example, 64 RD-for-RMW commands). The C-counter 42 is decremented by one (−1) every time one RD-for-RMW command is placed in the read command queue 43. The C-counter 42 is incremented by one (+1) every time an RD-for-RMW command is executed and a WR-for-RMW command is generated. Hence, if the C-counter 42 restores its count, the command process module 11 can recognize that all RD-for-RMW commands have been executed and that the process has proceeded to a read modify write (RMW) process.

The command process module 11 performs the write flush process if the command interpretation module 40 receives a flush command 112 (YES in Block 303). The flash command is issued when, for example, the main power supply for the SSD is cut. The flash command 112 initiates a write flush process, forcibly executing the write command (either a WRITE command or RW-for-RMW command) in the write command queue 50. The power supply is thereby switched to a spare power supply such as a capacitor, preventing a data loss in the buffer memory 22.

On receiving the flush command, the command process module 11 processes the RD-for-RMW command issued before the write process in the RMW operation, prior to any other commands. More precisely, the command process module 11 places the RD-for-RMW command from the read command queue 43 in the RMW read command buffer 45 (Block 307).

The RD-for-RMW command is sent from the RMW read command buffer 45 to the NAND memory interface 12 of each channel through the selectors 46 and 49. The read process is thereby performed in the RMW operation (Block 308). That is, the RD-for-RMW commands that assume a fly state, either being executed or to be executed, are executed prior to the normal read commands (i.e., READ commands).

When the read process performed in response to the RD-for-RMW command is completed (Block 305), the reply process module 52 generates a WR-for-RMW command 162 (Block 306). The WR-for-RMW command 162 is queued in the write command queue 50 (Block 309).

While the write command counter 51 is outputting no WRITE queue full signals 150 (NO in Block 310), the command process module 11 checks the C-counter 42 (Block 311). If the count has been completely restored in the C-counter 42 (YES in Block 311), all RD-for-RMW commands have been processed, and all WR-for-RMW commands have been queued in the write command queue 50. Hence, the command process module 11 sends the WRITE commands and the WR-for-RMW commands to the NAND memory interface 12 of all channels. That is, the command process module 11 performs a write flush process, forcibly executing the write command (either WRITE command or RW-for-RMW command) in the write command queue 50 (Block 313).

To be more specific, the selector 49 selects the write command 140 output from the write command queue 50, in accordance with a credit-full signal 130 and a flush command 112, both output from the C-counter 42, as may be understood from FIG. 2. Thus, the write command queue 50 sends the write commands (either WRITE commands or WR-for-RMW commands) to the NAND memory interface 12 of all channels. When all RD-for-RMW commands are processed, completely restoring the credit, the C-counter 42 outputs the credit-full signal 130.

As has been described, the SSD of multichannel program scheme, according to this embodiment, can reliably perform a write flush process, thereby forcibly executing any write commands (either WRITE commands or RW-for-RMW commands) in the write command queue 50 when a flush command is generated. The write flush process so performed can reliably prevent the data from erased in the buffer memory 22 even if the main power supply for the SSD is cut.

If normal write commands (WRITE commands) exist along with write commands for RMW (WR-for-RMW commands), WR-for-RMW commands may not be regenerated yet because the read command for RMW (RD-for-RMW commands) have not been processed yet. In this case, the read commands for RMW (RD-for-RMW commands) are moved to the RMW read command buffer 45, while the flush command is being processed, and are processed prior to any other commands. Write commands for RMW (RD-for-RMW commands) can therefore be efficiently prepared in this embodiment. As a result, the write flush process can be performed at high speed or high efficiency.

Since the write flush process is performed at high efficiency, the data stored in the buffer memory 22 can be written before it is erased and can reliably be protected. Moreover, the capacity of the spare power supply (e.g., capacitor), which may be used in place of the main power supply of the SSD, can be reduced, because the write flush process is performed at high speed.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus comprising:
   a write command module configured to process write commands in a buffer memory for writing data to nonvolatile memories associated with a plurality of channels, the write commands including write commands for a read moth write (RMW) operation;
   a read command module configured to process normal read commands and to process read commands for the RMW operation; and a controller configured to control the write command module and the read command module, wherein the controller is configured to:

cause the read command module to, in processing a flush command for a write flush process, process the read commands for the RMW operation prior to all the normal read commands, store the write commands for the RMW operation in the buffer memory, after the read commands for the RMW operation have been processed, and control the write command module to perform the write flush process including processing of all write commands in the buffer memory, the all write commands including the write commands for the RMW operation.

2. The data storage apparatus of claim 1, wherein the controller is configured to finish processing all read commands for the RMW operation by detecting unprocessed read commands for the RMW operation, the controller configured to process the flush command by generating the all write commands for the RMW operation which are associated with all read commands for the RMW operation.

3. The data storage apparatus of claim 1, wherein the read command module has a read command queue configured to store the normal read commands and the read commands for the RMW operation, and wherein the read command module is configured to acquire the read commands for the RMW operation or the normal read commands from the read command queue and process these read commands, and wherein the read command module is configured to, in processing the flush command, acquire the read commands for the RMW operation from the read command queue and process these read commands for the RMW operation prior to all the normal read commands in the read command queue.

4. The data storage apparatus of claim 3, wherein the read command module comprises:

a first buffer module configured to acquire a plurality of read commands for the RMW operation or the normal read commands from the read command queue and store this plurality of read commands in the order they are to be executed in a normal read command process; and a second buffer module configured to acquire the plurality of read commands for the RMW operation from the read command queue and store these read commands so that these read commands may be executed in preference in the write flush process.

5. The data storage apparatus of claim 1, wherein the write command module is configured to process an ordinary write command by performing a write command process of a multichannel program scheme, and wherein the write command module is configured to process the flush command by performing the write flush process, forcibly processing a write command containing the write command for the RMW operation, in order.

6. The data storage apparatus of claim 5, wherein the write command module comprises a write command queue, as the buffer memory, configured to store the write commands for the RMW operation and normal write commands, and is configured to perform a write command process of multichannel program scheme in order to process an ordinary write command, if the write commands for the RMW operation or the normal write commands for all channels are prepared in the write command queue.

7. The data storage apparatus of claim 6, wherein the write command module is configured to perform the write flush process, the write flush process comprising forcibly processing the write commands for the RMW operation or the normal write commands stored and prepared in the write command queue.

8. A memory control apparatus comprising:

a write command module configured to process write commands in a buffer memory for writing data to nonvolatile memories associated with a plurality of channels, the write commands including write commands for a read moth write (RMW) operation;

a read command module configured to process normal read commands and to process read commands for the RMW operation; and a controller configured to control the write command module and the read command module, wherein the controller is configured to:

control the read command module, causing to process the read commands for the RMW operation prior to all the normal read commands in processing a flush command for a write flush process, store the write commands for the RMW operation in the buffer memory after the read commands for the RMW operation have been processed, and control the write command module, causing to perform the write flush process including processing of all write commands in the buffer memory, the all write commands including the write commands for the RMW operation.

9. The memory control apparatus of claim 8, wherein the controller is configured to finish processing all read commands for the RMW operation by detecting unprocessed read commands for the RMW operation, the controller configured to process the flush command by generating the all write commands for the RMW operation which are associated with all read commands for the RMW operation.

10. The memory control apparatus of claim 8, wherein the read command module has a read command queue configured to store the normal read commands and the read commands for the RMW operation, and is configured to acquire the read commands for the RMW operation or the normal read commands from the read command queue and process these read commands, in the order the commands should be executed, and to acquire the read commands for the RMW operation from the read command queue and process these read commands for the RMW operation prior to all the normal read commands in the read command queue, in processing the flush command.

11. The memory control apparatus of claim 10, wherein the read command module comprises:

a first buffer module configured to acquire a plurality of read commands for the RMW operation or the normal read commands from the read command queue and store this plurality of read commands in the order they are to be executed in a normal read command process; and a second buffer module configured to acquire the plurality of read commands for the RMW operation from the read command queue and store these read commands so that these read commands may be executed in preference in the write flush process.

12. The memory control apparatus of claim 8, wherein the write command module is configured to process an ordinary write command by performing a write command process of a multichannel program scheme, and wherein the write command module is configured to process the flush command by performing the write flush process, forcibly processing a write command containing the write command for the RMW operation, in order.

13. The memory control apparatus of claim 12, wherein the write command module comprises a write command queue, as the buffer memory, configured to store the write commands for the RMW operation and normal write commands, and is configured to perform a write command process of multi-channel program scheme in order to process an ordinary write command, if the write commands for the RMW operation or the normal write commands for all channels are prepared in the write command queue.

14. The data storage apparatus of claim 13, wherein the write command module is configured to perform the write flush process, the write flush process comprising forcibly processing the write commands for the RMW operation or the normal write commands stored and prepared in the write command queue.

15. A method of controlling nonvolatile memories associated with a plurality of channels by a memory controller in a data storage apparatus, the method comprising:
   processing write commands in a buffer memory for writing data to the nonvolatile memories in an ordinary write operation;
   processing read commands for a read modify write (RMW) operation; and
   processing the read commands for the RMW operation prior to all normal read commands, in processing a flush command for a write flush process;
   storing the write commands for the RMW operation in the buffer memory, after the read commands for the RMW operation have been processed; and
   performing the write flush process including processing of all write commands in the buffer memory, the all write commands including the write commands for the RMW operation.

16. The method of claim 15, wherein the processing the read commands for the RMW operation comprises finishing processing all read commands for the RMW operation by detecting unprocessed read commands for the RMW operation, and the wherein the performing the write flush process comprises
   processing the flush command by generating the all write commands for the RMW operation which are associated with all read commands for the RMW operation.

17. The method of claim 15, wherein the memory controller comprises a read command queue configured to store the normal read commands and the read commands for the RMW operation, and
   wherein the processing the read commands for the RMW operation comprises:
   acquiring the read commands for the RMW operation or the normal read commands from the read command queue;
   processing these read commands;
   acquiring, in processing the flush command, the read commands for the RMW operation from the read command queue; and
   processing these read commands for the RMW operation prior to all the normal read commands in the read command queue.

18. The method of claim 17, wherein the memory controller comprises:
   a first buffer module configured to acquire a plurality of read commands for the RMW operation or the normal read commands from the read command queue and store this plurality of read commands in the order they are to be executed in a normal read command process; and
   a second buffer module configured to acquire the plurality of read commands for the RMW operation from the read command queue and store these read commands so that these read commands may be executed in preference in the write flush process.

19. The method of claim 15, wherein the processing write commands comprises processing an ordinary write command by performing a write command process of a multichannel program scheme, and wherein the performing the write flush process comprises processing the flush command and forcibly processing a write command containing the write command for the RMW operation, in order.

20. The method of claim 19, wherein the memory controller comprises a write command queue, as the buffer memory, configured to store the write commands for the RMW operation and normal write commands, and wherein the processing write commands comprises performing a write command process of multichannel program scheme in order to process an ordinary write command, if the write commands for the RMW operation or the normal write commands for all channels are prepared in the write command queue.

* * * * *